United States Patent [19]
Jones et al.

[11] Patent Number: 5,968,245
[45] Date of Patent: Oct. 19, 1999

[54] COMPOSITION FOR SOLID WASTE REMEDIATION

[75] Inventors: William M. Jones, Moraga, Calif.; Michael P. Doyle, Phoenix, Ariz.; Bruce W. Page, El Cerrito, Calif.

[73] Assignee: Encapco, Dublin, Calif.

[21] Appl. No.: 08/974,009

[22] Filed: Nov. 19, 1997

Related U.S. Application Data

[60] Provisional application No. 60/060,020, Sep. 17, 1997.

[51] Int. Cl.$^6$ .................................................. C09D 195/00
[52] U.S. Cl. ......................... 106/277; 106/225; 106/229; 106/235; 106/900; 588/256
[58] Field of Search ..................................... 106/277, 225, 106/229, 235, 900; 588/256

[56] References Cited

U.S. PATENT DOCUMENTS

| | | | |
|---|---|---|---|
| 4,260,493 | 4/1981 | Kretas et al. . | |
| 4,423,088 | 12/1983 | Graf et al. | 427/138 |
| 4,913,586 | 4/1990 | Gabbita . | |
| 5,162,600 | 11/1992 | Cody et al. | 588/236 |
| 5,193,936 | 3/1993 | Pal et al. . | |
| 5,242,493 | 9/1993 | Glynn, Jr. et al. . | |
| 5,304,704 | 4/1994 | Kammeraad . | |
| 5,344,485 | 9/1994 | Glynn, Jr. | 106/281.1 |
| 5,527,982 | 6/1996 | Pal et al. . | |
| 5,536,899 | 7/1996 | Forrester . | |

*Primary Examiner*—David Brunsman
*Attorney, Agent, or Firm*—Malcolm B. Wittenberg

[57] ABSTRACT

Solid waste contaminated with cationic metals is remediated with a composition that reduces the mobility of the metals. A recycled product is formed having improved structural properties for possible use as engineered fill such as road base material. Said composition comprising an emulsion of asphalt or tall oil pitch in water and a chemical fixing agent.

22 Claims, No Drawings

COMPOSITION FOR SOLID WASTE REMEDIATION

This is a continuation of provisional U.S. application 60/060,020 filed Sep. 17, 1997.

FIELD OF THE INVENTION

The invention relates to the treatment and remediation of solid waste that contains cationic metals. More particularly, this invention relates to the formulation of organic based emulsions that contain chelating or complexing agents or agents to form insoluble metal compounds. The emulsions are then used to serve two functions: 1) immobilize the cationic metal as determined by EPA's TCLP test; and 2) create a recycled product with improved structural properties as compared to the untreated solid waste. The remediated solid waste is then reused onsite or transferred offsite for commercial use.

BACKGROUND OF THE INVENTION

As land has been used over the years, certain contaminants have been introduced resulting in toxic conditions. In the past, such conditions have been routinely ignored. However, individuals as well as government agencies have become increasingly sensitive to problems which ensue as a result of the presence of hazardous waste including contaminated soils and there is now a general recognition that remediation is not a mere optional expedient.

One such recognized class of contaminants consists of heavy cationic metals such as lead. Capillary and hydraulic flows of water in porous media contaminated by such heavy metal species has resulted in, for example, aquifer contamination. Removal of heavy metals from contaminated soils is energy intensive and time consuming since the mobility of heavy metal ions is orders of magnitude slower in soil than in water. As such, ways have been sought to remediate soil by chemical treatment such as by binding the metal contaminants in place so that they will not leach out of the soil thus producing significant environmental benefits at substantial cost savings.

A common cationic metal requiring remediation in solid waste is lead. Lead as a contaminant is often found in the soils around lead smelters, battery breaking/recycling facilities, incinerator ash facilities and foundries including metal and leaded gasoline manufacturing plants. Contamination occurs when lead containing chemicals are used in the plants, and waste containing the lead is allowed to spill over or drain into the soil. Many abandoned hazardous waste sites are heavily contaminated with lead, threatening human health, the food chain, the ecosystem and the environment. Federal legislation, such as the National Contingency Plan (NCP), the Superfund Act (CERCLA) and the Superfund Amendments Reauthorization Act (SARA) specify the remediation of sites containing lead-toxic soils and other solid wastes.

The Resource Conservation and Recovery Act of 1976, commonly known as RCRA, provided for federal classification of hazardous waste. The statutory language defines "hazardous waste" as solid waste or combinations of solid waste which pose a "substantial present or potential hazard . . . when improperly treated, stored, transported, or disposed of, or otherwise mismanaged." Any solid waste that exhibits one of the hazard characteristics defined in subpart C of Part 261, Volume 40, Code of Federal Regulations is, by definition, a hazardous waste.

A solid waste is considered to be hazardous waste if it is listed, or it exhibits characteristics of either ignitability, corrosivity, reactivity, or toxicity as determined by the Toxicity Characteristic Leaching Procedure (TCLP) (USEPA Method 1311). The test is aimed at identifying the tendency of wastes to generate a leachate with concentrations of contaminants greater than the values listed in Appendix II of the Code of Federal Regulations, Part 261.24, page 406, revised Jul. 1, 1988. For instance, if concentrations of leachable, mobile lead are found to be greater than 5 milligrams per liter, the material is considered characteristically toxic for lead and hence hazardous with respect to lead content. Such characteristically toxic wastes require treatment to comply with the USEPA regulations defining the treatment standards for the respective contaminant of concern.

Any solid waste that contains leachable TCLP constituent levels in excess of those values listed in the above referenced Appendix II is considered characteristically toxic and hence hazardous. Such hazardous waste must be treated with the appropriate Best Demonstrated Available Technologies (BDAT) and/or with an alternative technology to decharacterize the waste for heavy metal toxicity. In other words, treatment of the heavy metal-bearing solid waste with a BDAT for decreasing TCLP heavy metal to a level below the treatment standard for that metal is required before land disposal is permitted. Land disposal methods include waste staging on a land surface, placing waste into a landfill, using surface impoundment techniques, waste piling, disposing of waste in injection wells or land treatment facilities (land farming), or impounding the waste in salt domes, salt bed formations, underground mines or caves, and bunkering the waste in concrete vaults. For example, land disposal restrictions ban treated wastes with TCLP levels greater than 5 mg/l of lead in the leachate although TCLP levels other than 5 mg/l may be acceptable for other waste metals contemplated herein. Such characteristic heavy metal toxic wastes must be treated with a cost effective and practical technology that is commercially available and that provides substantial treatment, and that beneficially results in a decrease in risk to human health and the environment.

For the sake of convenience, lead is uniformly referred to in practicing the present invention. However, it must be understood that this invention contemplates, and is thus useful in the immobilization of, other cationic metals such as barium, beryllium, chrome III, cobalt, copper, nickel, silver, and zinc.

Further, although reference is repeatedly made to soil as the medium being remediated in practicing the present invention, it must be understood that various other carriers of mobile cationic metals are contemplated. Such carriers include dredge spoils, ash from, for example, incinerators, slag from, for example, steel plants, demolition materials such as concrete and brick, sludges, drilling mud and grit from, for example, sandblasting operations.

Various conventional methods have been tried to remove leachable, mobile lead from soils and solid waste materials. Those methods include washing, leaching and extracting the lead. According to conventional practice, contaminated soil or solid waste material is excavated from the ground for processing and/or washing. During washing, the contaminated material is immersed or supersaturated in water or other specified solutions while it is being agitated. Removal of lead from contaminated soils and solid wastes by leaching, extraction and/or washing procedures is extremely expensive and in many cases is cost-prohibitive because this method generates vast quantities of lead-toxic wastewater which requires further treatment and disposal.

Other methods have included those classified as "encapsulation". The lead bearing soil is mixed with asphaltic materials and compacted into a monolithic structure with low permeability. This method assumes that the soil treated thusly will never be disturbed or reduced to a granular material. Soils treated in this manner when broken up and granulated for TCLP testing fail to pass treatment standards.

Further conventional techniques have involved the chemical fixation of lead in contaminated soils and solid waste by use of inorganic reagents such as cement, lime, silicates or alumino-silicates. These materials increase the pH of the soil to 12 or even higher and often raise questions about the long-term stability of the product. This concern is partially based upon the fact that the products made with these inorganic reagents usually have very poor strength characteristics. The reason for that is that these reagents rely on the quality of the aggregate for much of their strength. A good cement, for example, depends on a well-sorted consistent aggregate to meet quality specifications. When used to treat a soil that often contains a significant percentage of fine materials such as silts and clays, the resulting product may only be good for disposal. This, of course, means that the product is not suitable for commercial use. The emulsions of the present invention, by contrast, do not rely solely upon the properties of the aggregate to make a quality product. The asphalt or pitch base stock in the emulsion of this invention can convert a poorly sorted soil with a high percentage of silts and clays into a high quality road base material.

Various prior art approaches to soil remediation have been examined in the past. For example, U.S. Pat. Nos. 5,193,936 and 5,527,982 relate to methods of treating metal-bearing materials, such as contaminated soil, to stabilize leachable metal contained therein. The methods comprise the steps of mixing a metal-bearing material with a mixture which comprises a first component and a second component to form a second mixture, wherein (1) the metal-bearing material contains at least one leachable metal selected from a group, including lead, (2) the first component supplies at least one member selected from the group consisting of sulfates, halides and silicates, and (3) the second component supplies at least one phosphate ion. These patents discuss the EPA TCLP test and also demonstrate the utility of phosphoric acid, and phosphates in general, as lead binders for contaminated soil.

U.S. Pat. No. 5,536,899 discloses a method for reducing the leaching of lead from a lead bearing waste, consisting essentially of contacting the waste with a water soluble phosphate and a complexing agent containing iron, aluminum, chloride or combinations thereof. The process is practiced under alkaline or neutral pH conditions.

U.S. Pat. No. 4,913,586 discloses a method for the treatment of petroleum contaminated soil. Of note is the utilization of humic acid and lime as the protective mixture.

U.S. Pat. No. 4,260,493 teaches a process for the waste treatment of a spent metal plating solution containing copper or nickel.

U.S. Pat. No. 2,003,921 discloses a process for waterproofing and filling cavities in the ground. This patent discloses the use of asphalt-type emulsions for providing a water-proof soil lining.

U.S. Pat. No. 2,851,824 discloses methods of stabilizing and improving soils utilizing an asphalt-type component dispersed in an acidic aqueous medium.

U.S. Pat. No. 5,162,600 teaches a method of treating lead-contaminated soil to reduce the amount of mobile lead contained in the soil. The method comprises providing an agent selected from the group consisting of inorganic phosphate compounds, alone or as mixtures and contacting the agent with the soil to immobilize the lead contained therein. At Table 1, oxalic acid also was shown to have lead binding properties, but considered "too toxic" for use.

U.S. Pat. No. 5,304,703 discloses a process fi)r soil remediation to remove chemical soil contaminants such as polynuclear aromatics. The process involves introducing an emulsion consisting essentially of a nonionic surfactant material dispersed in water. Preferred nonionic surfactants include the polyoxyethylene adducts of tall oil, rosin acid, stearic acid and oleic acid. In the process, the emulsion is used to encapsulate the contaminated soil, with the surfactant having an affinity for the contaminants which are drawn into the encapsulating coating of the soil particles and subsequently removed with the encapsulating material in a later treatment step.

U.S. Pat. No. 3,552,130 discloses a method of injecting chemicals into soil to create a liquid impervious layer or zone. In one embodiment, the liquid impervious zone is formed by introducing bituminous emulsions into the soil.

U.S. Pat. No. 4,028,897 discloses a soil stabilization composition prepared by combining an oil (mineral oil, napthenic oils and crude oils were preferred) with a rubber latex material. If desired, bituminous or asphaltic materials may be included in the composition. The material is applied in the form of an emulsion including a nonionic emulsifier.

U.S. Pat. No. 4,260,493 discloses a composition and method for fixing hydrocarbon contaminants in soil. The process includes forming a cold asphalt mixture by blending with the contaminated soil asphalt roof cuttings containing glass fibers and a slow-setting "cold mix emulsion" of the type known in the trade as "SS-1" and "SS-1 H" emulsions. The resulting mixture can be used as a recycled asphalt pavement.

The processes as described above are still lacking in several areas. The cases that use emulsions are aimed at treating hydrocarbon contaminated soil and will not treat lead or other cationic metal contaminated soil below the respective TCLP standards. The other processes will treat the lead and other cationic metal contaminated soils below their respective TCLP standard but are not designed to create a recycled product. Further, many of these processes dramatically increase the volume of the material being treated, in some cases by as much as 50 percent.

What is still needed therefore is a process that can be adjusted to meet a variety of soil conditions, treat the leachable lead and other cationic metals to TCLP standards, create a recycled soil product that can be left on-site, or used elsewhere as a roadbase, engineered fill or aggregate material and does not increase the volume of the treated material by inordinate amounts.

SUMMARY OF THE INVENTION

This invention relates to the remediation and creation of a recycled product by treatment of cationic metal contaminated soil or solid waste. This is accomplished by mixing the soil or solid waste with an emulsion system that coats and applies a thin film of residue to the waste particles. The residue is organic (asphalt and/or tall oil pitch base stock) and contains a chelating or complexing agent or a precipitating agent. These are referred to hereinafter as "agents" or "complexing" agents. The agent is selected based on the metal contained in the soil or solid waste. Agents may be used individually or in combination. The emulsion's role is to carry the agent to the soil or waste particle in an aqueous environment, efficiently coat the surface of the particle distributing the agent and provide adhesion, cohesion, and water resistance for the compacted soil mixture. The organic base also has a synergistic role with the selected agent in immobilizing the metal. This is, in part, due to the acids that are contained in the asphalt or tall oil pitch.

The emulsion, as discussed above, carries the selected agent and distributes it on the soil particle. Based on the type of metal, concentration, soil type and condition, and intended use for the product, different types of acids may be selected. Based on the acid selected, the immobilization method is different. The mechanism may be chelation, or, formation of a insoluble metal form, combination thereof or even be more complex given the organic base involved along with soil chemistry. Provided below are discussions of the different technologies involved in this novel invention.

The principal object of this present invention is to treat soil to render a hazardous waste non-hazardous and suitable for disposal. As noted below, as a preferred embodiment, it is contemplated that in certain instances, the treated soil can be used to create a recycled product that may exhibit certain physical properties making it useful as, for example, an engineered fill or as a road base. As noted previously, in determining whether soil has been adequately remediated by binding heavy metals therein, current regulations provide guidance. Specifically, 40 CFR Sec. 261 provides a method for carrying out a recognized toxicity characteristic leaching procedure (TCLP) which is designed to determine the mobility of both organic and inorganic analytes present in liquid, solid and multiphasic waste.

Another object of the present invention is to create a recycled product that can be mixed in various percentages with commercial aggregate. The recycled product or "synthetic aggregate" would become a component of the final aggregate blend. Emulsions formulated with emulsifiers that form amine salts in the presence of calcium hydroxide yield an asphalt film that is chemically drawn to the soil particle. This chemically bonded asphalt film forms a hard, durable coating around the soil particle that will resist mechanical or moisture induced abrasion needed for use as an aggregate. The chelating or complexing agent would be incorporated into the emulsion to immobilize the cationic metal below TCLP standards.

DETAILED DESCRIPTION OF THE INVENTION

The use of asphalt to encapsulate contaminants in a soil matrix is well known in the field and has been recognized in the wording of regulations promulgated by the State of California and the Federal government, for example. The improvement of this invention is that current technology has been extended to include TOP emulsions and a chemical mechanism for immobilizing metals. This reaction occurs when the proper chelating or complexing agents or precipitating agents are included in the emulsion to react with heavy metals to form the immobilized species such as lead phosphate, in the case of lead, under favorable conditions.

The asphalt and tall oil pitch emulsions revealed in this invention can be used in two ways to solve problems involving hazardous waste, such as contaminated soils. One approach is to use the emulsions as a treatment technology. The goal of the treatment approach is to render a hazardous waste non-hazardous and suitable for disposal. In this case, the criteria governing success of the treatment process are based on the mobility of the contaminant in the treated product. Mobility is measured by subjecting the product of the treatment process to one or more leaching tests. The most widely used such test is the EPA's Toxic Characteristic Leaching Procedure (TCLP) in which acetic acid solution is used and the amount of contaminant that leaches from the treated product into the acetic acid is measured. If the amount of contaminant found in the acetic acid is below an EPA-established concentration called the Land Disposal Restriction (LDR) Treatment Standard, the treated product can be deposited in a permitted landfill.

The second approach is to use the present emulsions to create a recycled product. That is, through the use of the emulsion, the contaminant in the waste is rendered immobile by chemical bonding while the material simultaneously exhibits improved physical properties making it a useful product.

The organic emulsions discussed in this invention do not rely on the properties of the aggregate to make a quality product. The asphalt or pitch in the emulsion can convert a poorly sorted soil with a high percentage of silts and clays into a high-quality road base material, called Emulsion Treated Base (ETB). However, the present invention can be used to create a recycled product that can be mixed in various percentages with commercial aggregate. The recycled product or "synthetic aggregate" would become a component of the final aggregate blend. Emulsions formulated with emulsifiers that form amine salts in the presence of calcium hydroxide yield an asphalt film that is chemically drawn to the soil particle. This chemically bonded asphalt film forms a hard, durable coating around the soil particle that will resist mechanical or moisture induced abrasion needed for use as an aggregate. The chelating or complexing agent would be incorporated into the emulsion to immobilize the cationic metal below TCLP standards. Suitable emulsifiers for use in such circumstances include, for example, tallow diamine, tallow tetra amine, triamido amine and imo-dazaline.

Emulsions

In general, emulsions are composed of three essential ingredients; an organic component characterized by low solubility in water, known as the dispersed phase; a water phase which is commonly 30% or more of the final mixture, known as the continuous phase, and an emulsifying agent or surfactant selected to function with the organic component and the water added to the water phase. Additionally, small quantities of hydrochloric acid or sodium hydroxide can be used to adjust the pH of the water/surfactant solution. By proportioning both phases at a proper temperature through a colloid mill simultaneously, an emulsion is formed.

An emulsion may be defined as an intimate mixture of two immiscible liquids, one of which is dispersed in the other in the form of very fine droplets. Where the dispersed phase, commonly called the internal phase, is an oil and the continuous phase is water, then the emulsion is known as the oil in water type. Conversely, if the water is the internal phase and the oil is the continuous phase, the emulsion is a water in oil type. The present invention deals with oil in water types only.

In preparation of the emulsions, dispersion of the internal phase is almost always accomplished by a colloid mill or some other mechanical means such as a mixer or homogenizer. The system is unstable and the droplets will coalesce unless a suitable emulsifying agent is present in the system.

An emulsifying agent must have special solubility characteristics; that is, it must be compatible with both the oil and the water phases. This is possible if the molecule possess both polar and nonpolar portions. These molecules are surface active (surfactants) and when placed in an oil-water systems will tend to orient in a very specific manner. The polar portion with its affinity for water will orient into the water phase. The nonpolar portion will orient into the oil phase.

Emulsifying agents can be anionic (negative), cationic (positive), or nonionic (no charge). This is determined by the organic portion of the molecule, which imparts a charge to the surface of the internal phase droplets. The water phase which contains the properly selected emulsifying agent is adjusted to a specific pH by adding small amounts (less than 0.5%) of hydrochloric acid or sodium hydroxide.

Emulsions are manufactured by proportioning the oil phase (asphalt or tall oil pitch) and the water phase which contains the emulsifying agent through a colloid mill simultaneously. The temperature of the two phases is controlled such that the oil phase is fluid enough to form droplets within the colloid mill. The water phase temperature is such that the output temperature of the emulsion is below boiling and but hot enough that the emulsion will not destabilize after manufacture.

The internal phase of most emulsions are 50 to 70 percent. The final emulsion pH may be 2 to 12. Commonly, cationic emulsion pH's will be below 5, anionic emulsions above 7 and nonionic neutral.

For the purposes of this invention, the preferred organic base stock component will be either asphalt or a tall oil pitch (TOP). It has also been discovered that the addition of certain chelating agents in proper concentrations as high as 6% for oxalic acid or 12% for phosphoric acid to these asphalt or TOP emulsions can significantly increase their ability to immobilize particular environmental contaminants. For example, the inclusion in the emulsion formulation of a selected carboxylic acid, known to have a high stability constant with a metal such as lead, can improve the ability of the emulsion to immobilize that metal by chelation when the emulsion is applied to a soil contaminated with the metal.

The environmental aspects of this invention became apparent when it was observed that a contaminated soil showed a significant reduction in the mobility of the contaminant when it was treated with one of these emulsions. For example, a soil that was spiked with lead sulfate to a concentration of about 2,000 mg/kg of lead had a soluble lead, by TCLP, of about 40 mg/l. When treated with 12% of an emulsion based on asphalt, tall oil pitch, or a combination of the two, the soluble lead by the same test was reduced to about 25 mg/l. The immobilization of part of the lead by this treatment can be explained by considering the physical-chemical make-up of asphalt and pitch. For example, it is generally believed that asphalts are colloidal systems made up of asphaltene micelles in an oily medium. These micelles can be peptized to form molecular-scale agglomerates by the action of hydrocarbon resins which contain resin acids and their esters and resin alcohols. The agglomerates or micelles of polar asphalt molecules can sequester complexes and acids. Carboxylic acid groups as well as other polar functional groups such as phenols, ketones, and sulfoxides will concentrate at the interface of the micelles and the oily medium. These polar micelles can act as repositories of contaminant metal-carboxylic acid functional group combinations in this model. "Tall oil" includes manmade and naturally occurring tall oil, tall oil pitch, tall oil blends and similar tall oil products. Tall oil is the liquid resinous material obtained in the digestion of wood pulp from paper manufacture. Commercial tall oils comprise a complex mixture of fatty acids, resin acids, sterols, higher alcohols, waxes and hydrocarbons. The acid components also may be present as the esters thereof.

Chelation

An important discovery of this invention is that the addition of a carboxylic acid with a high affinity for a contaminant metal to the asphalt or pitch emulsion can significantly improve its ability to immobilize the metal. The previously described model of micelles can be expanded to include the carboxylic acid with its hydrocarbon end held by the asphalt or pitch organic structure while the functional group is forming a chelate with the metal. For the chelate formation to be successful, it is important that the pH of the solid waste emulsion combination is above the pK of the acid being used. That is, if the pH is lower than the pK of the acid, it will be in the protonated form and incapable of chelating with the metal.

In addition to the pK of the carboxylic acid, the other important property of the acid is its stability constant for the metal targeted in the application under consideration. The stability constant is the quantitative expression of the "high affinity" for the metal being targeted. According to this model, in order to create a product with a low degree of contaminant mobility as expressed by a specific test, it is important to use an acid with a stability constant higher than the one used in the test. Since the TCLP uses acetic acid, this invention teaches that an emulsion containing oxalic acid can immobilize lead and other cationic metals. This is so because oxalic acid has a higher stability constant for lead than acetic acid. Test results on soil spiked with lead sulfate have shown this to be an accurate prediction of the model.

Another important discovery of this invention is that inorganic acids such as phosphoric acid can be concentrated in the emulsion and will have synergistic effects with the organic base of the emulsion. The organic base has a high affinity for the metal contaminant and soil. The phosphoric acid, if in the proper pH environment, has an affinity for the metal. Phosphoric acid has a pK of 2.1, 7.2 and 12.4. By adjusting the emulsion so that the resulting emulsion/soil mixture has a pH above the pK of the phosphoric acid, the acid and metal will have affinity for one another. Under these conditions, if the contaminant is lead, the phosphoric acid will form stable forms of lead phosphate, a very insoluble form of lead. The organic base emulsion will provide a carrier for the phosphoric acid to allow thin films of the organic base and acid to coat the soil particles. This leads to very low levels of phosphoric acid needed to pass TCLP requirements.

The present invention is designed, as a preferred embodiment, to create a remediated soil having physical properties making it useful. Under 40 CFR § 266.20(b), waste that is recycled and used in a manner constituting disposal is exempt from RCRA regulation if the resulting product is produced for the general public's use and it contains recyclable materials that have undergone a chemical reaction so as to become inseparable by physical means and if the product meets LDR treatment standards. The resulting product, again as a preferred embodiment, is intended to meet the structural specifications for granular and asphaltic road base materials.

Because of the relatively low capital investment for mixing equipment, emulsified asphalt (cold mix) has been used to treat and recycle petroleum and lead impacted soils into valuable construction materials. Depending on the needs, and the site development and construction schedules, the treated soils may be recycled into 1) general fill; 2) trench backfill; 3) non-expansive fill under concrete slab-on-grade; 4) rammed soils for house construction; 5) structural backfill behind bridge abutments or retaining walls; 6) granular subbase, base and emulsion-treated base for roadway construction; 7) landfill capping materials; and 8) roadway embankment erosion control capping. The success of such an emulsion treatment program hinges on contaminant retention capability, workability, rate of strength development, moisture susceptibility and permeability of the treated soils.

A series of bench scale tests were undertaken to study the strength characteristics of emulsion-treated soils for roadway construction. Since the treated soils can be used as a bituminous-treated base, Marshall test was selected to evaluate the tensile strength characteristics of the treated soil. If the end use of the treated soils is granular base or subbase, the compressive strength characteristics of the treated soils should be investigated using either Resistance (R)-value, CBR or unconfined compression tests. A silty sand soil obtained from a local quarry was treated with various percentages of emulsion and lime. Specimens of the treated soil were fabricated following the procedure of Marshall test (ASTM D1559). After being cured under two conditions —"early cure" and "fully cured and water immersed," the specimens were tested for stability and flow at room temperature (about 68 to 70° F.). To demonstrate the benefits of treating and recycling impacted soils for roadway construction, simple pavement designs were performed along with estimated potential cost savings.

The soil used was sampled from a Milpitas, Calif. quarry. To characterize the soil, basic geotechnical tests such as Atterberg Limits, sieve analysis, hydrometer, specific gravity, compaction and sand equivalent were performed. The test results are summarized below:

| Sieve Size | Percent Passing |
|---|---|
| ¾" | 100.0 |
| ½" | 95.8 |
| ⅜" | 90.7 |
| #4 | 79.5 |
| #8 | 75.4 |
| #16 | 73.0 |
| #30 | 70.3 |
| #50 | 62.7 |
| #100 | 41.0 |
| #200 | 28.6 |

| Hydrometer Analysis (ASTM D-422) | |
|---|---|
| Particle Size | Percent Passing |
| 0.074 mm | 28.6 |
| 0.055 mm | 28.0 |
| 0.037 mm | 25.5 |
| 0.019 mm | 21.5 |
| 0.009 mm | 18.9 |
| 0.005 mm | 15.6 |
| 0.002 mm | 12.4 |
| 0.001 mm | 8.5 |
| Specific Gravity (ASTM D-854) | 2.65 |
| Liquid Limit (ASTM D-4318) | 29 |
| Plasticity Index (ASTM D-4318) | 6 |
| Sand Equivalent (CAL 217) | 13 |
| Maximum Dry Density (ASTM D-1557) | 119.6 pound per cubic foot |
| Optimum Moisture Content (ASTM D-1557) | 12.0% |

Based on the basic geotechnical test results, the Curtner soil is classified as follows:

| | Unified Classification System | AASHTO Soil Classification System |
|---|---|---|
| Curtner Soil | Silty Sand (SM) | Silty Sand (A-2-4) |

The emulsion (EB001-AC6) used herein consists of 50% asphalt, 47.7% water, 2% emulsifier and acid. The lime for this research was selected according to ASTM specifications with regard to lime for soil stabilization use (ASTM C-977) and a powder form lime was used.

The strength characteristics of the emulsion-treated soil are closely related to the density of the compacted specimens. Therefore, it was necessary to optimize the water content at compaction to maximize the strength of the treated soil. This was done for each lime content (2, 4 or 6 percent).

The Marshall compaction mold, compaction pedestal and procedure were used to determine the optimum water content of the soil mixed with various proportions of lime (2, 4 and 6 percent). The soil was hand-mixed with the specific percent of lime and 8% emulsion (selected arbitrarily). Based on the visual appearance of the mixture, additional water was added prior to compaction to assure that the optimum water content was captured. After mixing and moisture conditioning, the soil was compacted into a 4-inch diameter Marshall mold by applying 50 blows on both sides of the briquette. The density and water content of each briquette was determined. It was concluded that the lime content appears to have very little effect on the maximum dry density and optimum water content of the soil. The test results indicate that the treated Curtner silty sand has a maximum dry density of 109.5 pcf and optimum water content of 13%.

To evaluate the strength characteristics of the treated soil, various proportions of emulsion (0, 8, 12 and 16%) and lime (0, 2, 4 and 6%) were incorporated in the Curtner silty sand. The briquettes of the emulsion-treated soil were fabricated at about the optimum water content in order to capture their highest strength. Based on the optimum water content and percent of emulsion to be added, the pre-mixing water contents of the untreated soil were calculated. The untreated soil was first moisture conditioned to the pre-mixing water content. Then, emulsion and/or lime were hand-mixed into the soils using a stainless steel bowl and a mixing spoon. When used in conjunction with emulsion, lime was added and mixed with the soil prior to adding emulsion. To reduce "balling up" and to achieve a relatively uniform mix, emulsion was added and mixed into the soil or soil-lime mixture incrementally. The mixing process continued until a visually relatively uniform mix was achieved. It generally took about 2 to 3 minutes to complete a 4000-gram mix. Based on visual observations, the presence of lime promoted more even mixing and improved the workability of the mix. After mixing, the water contents of the treated soils were checked quickly and, if necessary, additional water was added to bring the treated soil's water content to the optimum moisture content prior to compaction.

After mixing with the designated amount of lime, emulsion and water, the treated soil was weighed and compacted into 4-inch diameter Marshall molds generally following the procedure contained in ASTM D-1559, except for the temperature requirements The samples were mixed at room temperature consistent with "cold" emulsion treatment. The entire briquette fabrication was performed at room temperature and 50 blows were applied on both ends of the briquettes.

The briquettes were cured under the following two conditions prior to testing:

1. "Early Cured" —Samples were cured in mold in a horizontal position for 24 hours at room temperature (68 to 70° F.); or
2. "Fully Cured and Water Immersed" —Samples were cured in mold in a horizontal position for 24 hours at room temperature and out of mold in 100° F. oven for another 24 hours. After curing, the samples were immersed in water under a vacuum of 100 mm Hg for one hour followed by one hour of soaking in water without vacuum.

|  | Optimum Emulsion Content (%) | Optimum Lime Content (%) | Stability (lbs) | |
| --- | --- | --- | --- | --- |
|  |  |  | "Early Cured" | "Fully Cured and Water Immersed" |
| Soils |  |  |  |  |
| Curtner Silty Sand | 8 | 6 | 2750 | 22410 |

The "early cured" condition is designed to study the short-term strength of the treated soils which is a major factor on 1) the construction schedule; 2) the selection of appropriate construction equipment; and 3) the ability of making grade to the specified tolerances.

The "fully cured and water immersed" condition will provide the "worst cast" long-term strength of the treated soils for pavement design. The two-hour water immersing simulates fair to good drainage conditions.

Depending on the climate and groundwater conditions of the project site, the curing conditions can be modified to model the anticipated site conditions.

Marshall tests on the briquettes of treated soil were conducted following the procedures, except the temperature requirement, contained in ASTM D-1559. All the Marshall tests were performed at room temperature (68 to 70° F.) using a Gilson's DigiTrac Stability machine.

In reviewing the data, the following characteristics were observed:

1. The emulsion-lime treated Curtner silty sand have "early cured" stabilities of about 1,600 to 2,800 pounds.
2. The "early cured" stabilities of the emulsion-treated-only Curtner silty sand decrease with increase of emulsion content.
3. The incorporation of lime significantly increased the "early cured" stabilities of the emulsion-treated Curtner silty sand.
4. Under "early cured" conditions, no optimum emulsion content was observed.
5. The emulsion-lime treated Curtner silty sand have "fully cured and water immersed" stabilities of about 1,800 to 2,400 pounds.
6. The incorporation of lime significantly increased the "fully cured and water immersed" stabilities of the emulsion-treated Curtner silty sand.
7. Under "fully cured and water immersed" conditions, an optimum emulsion content of 8% was observed.

The success of recycling emulsion-treated contaminated soils into road building materials hinges on their short-term ("early cured") and long-term ("fully cured") strengths, workability and moisture susceptibility ("water immersed" strength) of the treated soils which are strongly related to the optimum emulsion and lime contents. Based on the "fully cured and water immersed" stabilities, an optimum emulsion content of about 8% can clearly be seen for the Curtner silty sand. With 8% emulsion, the optimum lime content from those tested for Curtner silty sand appears to be 6%. Finally, the "early cured" stability of the optimally treated soil should be checked to assure that the treated soil is strong enough to support the placement and compaction of the overlying materials such as asphalt-treated permeable materials and asphalt concrete, and the anticipated construction traffic. The "early cured" and "fully cured and water immersed" stabilities of the optimally treated Curtner silty sand are as follows:

As shown above, the "early cured" and "fully cured and water immersed" stabilities of the Curtner silty sand are more than 2,400 pounds which are comparable to the stabilities of conventional bituminous-treated bases.

To demonstrate the financial benefit of recycling the emulsion-lime treated soils into roadway constructions materials, a simple pavement was designed for a two-lane roadway with expected 18-kip Equivalent Single Axle Loads of $1 6 \times 10^4$ (equivalent traffic index of 9.5), roadbed soil effective resilient modulus of 5,000 psi and good drainage conditions.

Using the AASHTO design procedure, the pavement section was calculated to be 8 inches of asphalt concrete over 16 inches of granular base.

Based on a stability of 1,800 psi and the structural coefficient-Marshall stability relationship for bituminous-treated base contained in the AASHTO guide for design of pavement structures, a structural coefficient of 0.32 was conservatively estimated for the emulsion-lime treated Curtner silty sand. Using the estimated structural coefficient of 0.32 suggests that the 8 inches of asphalt concrete over 16 inches of granular base pavement can be replaced by 7 inches asphalt concrete over 9 inches of emulsion-lime treated Curtner silty sand. The resulting savings on material cost may be as high as $96,000 per mile of two-lane road (based on a granular base cost of $12 per cubic yard and asphalt concrete cost of $45 per cubic yard).

As indicated by the test results discussed above, contaminated soils like the Curtner silty sand treated with optimum amounts of emulsion and lime can be recycled into conventional roadway construction materials. The use of lime increases the short-term and long-term tensile strength, promotes even mixing and improves the workability of the emulsion-treated Curtner silty sand. These are probably the results of the lime reacting with the clays in the Curtner silty sand.

No special equipment or specially trained workers are required for placement and compaction of emulsion-lime treated soils. Local roadway construction workers can use conventional roadway construction equipment to place and compact emulsion-lime treated soils. Because of the high "early cured" strength of the emulsion-lime treated Curtner silty sand, asphalt concrete can be placed immediately after compaction of the treated soil. With proper testing, selection of emulsion and lime contents, mixing, placement, compaction and quality control during construction, emulsion-lime treated silty sand can replace other base materials such as untreated granular base, subbase, cement-treated or bituminous-treated base for roadway construction. The resulting savings on material cost can be substantial.

The above noted soil treatment tests were tabulated as follows:

| Percent Lime Added | Percent Emulsion Added | Dry Density (pcf) | | As-Tested Moisture Content (%) | | Marshall Instability (lbs) | | Flow ($10^{-2}$ inch) | |
|---|---|---|---|---|---|---|---|---|---|
| | | Early Cured | Fully Cured and Water Immersed | Early Cured | Fully Cured and Water Immersed | Early Cured | Fully Cured and Water Immersed | Early Cured | Fully Cured and Water Immersed |
| 0 | 0 | 118.1 | (1) | 9.5 | (1) | 2720 | 0(1) | 12.55 | (1) |
| 0 | 8 | 111.9 | 109.1 | 10.4 | 15.3 | 1236 | 490 | 18.1 | 25.72 |
| 0 | 12 | 110.8 | 110.3 | 11.1 | 12.9 | 1662 | 999 | 19.05 | 23.16 |
| 0 | 16 | 106.8 | 104.4 | 11.0 | 15.6 | 1228 | 452 | 26.66 | >39 |
| 2 | 0 | 109.8 | (2) | 8.7 | 17.8 | 2209 | 134(2) | 12.5 | 6.55 |
| 2 | 8 | 111.6 | 110.5 | 11.3 | 13.7 | 2095 | 1996 | 12.55 | 11.05 |
| 2 | 12 | 109.4 | 109.3 | 11.6 | 12.6 | 1834 | 1826 | 14.55 | 16.55 |
| 2 | 16 | 107.8 | 108.2 | 10.7 | 12.4 | 1869 | 1651 | 16.05 | 16.05 |
| 2 | 16 | 107.8 | 108.2 | 10.7 | 12.4 | 1869 | 1651 | 16.05 | 16.05 |
| 4 | 0 | 109.8 | (3) | 8.6 | 17.7 | 2400 | 270(3) | 11.05 | 10.1 |
| 4 | 8 | 109.4 | 108.7 | 11.2 | 14.1 | 1608 | 1789 | 11.05 | 11.05 |
| 4 | 12 | 108.4 | 106.8 | 10.8 | 13.6 | 1743 | 1810 | 14.05 | 13.05 |
| 4 | 16 | 106.7 | 107.0 | 11.6 | 12.4 | 2060 | 1917 | 17.55 | 13.55 |
| 6 | 0 | 113.5 | (4) | 7.7 | 16.3 | 2225 | 1060(4) | 10.05 | 10.1 |
| 6 | 8 | 110.3 | 111.1 | 10.5 | 14.2 | 2751 | 2419 | 19.55 | 14.05 |
| 6 | 12 | 109.9 | 108.3 | 9.7 | 12.5 | 2790 | 2034 | 16.05 | 17.6 |
| 6 | 16 | 108.0 | 107.1 | 9.9 | 12.4 | 2778 | 2036 | 19.0 | 14.05 |

(1) = Sample broke apart during water immersing
(2) = About 30% mass loss during water immersing
(3) = About 15% mass loss during water immersing
(4) = About 5% mass loss during water immersing In preparing emulsions in accordance with the present invention, a strongly acidic aqueous emulsifier solution is prepared, and then blended with the tall oil or asphaltic component in order to prepare the finished emulsion. A preferred composition for the emulsifier solution is approximately 4% emulsifier, 84% water and 12% oxalic acid or 4% emulsifier, 72% water and 24% phosphoric acid. It is preferred that only organic acids be used herein such as stearic, oxalic and humic or inorganic acid such as phosphoric acid. Preferred emulsifiers are a nonylphenol with ethylene oxide or lignin amine. Other emulsifiers also can be used. It is desired that the preferred emulsifier solution, once prepared, be strongly acidic, in the range of about pH 1.0. Accordingly, the proportion of water and acid in the solution may be adjusted as needed in order to obtain an emulsifier solution in this strongly acidic range.

The heated emulsifier solution and tall oil or asphalt then are blended in a homogenizer or a colloid mill to form the finished emulsion. The blending rate is selected to prevent air entertainment or foaming from occurring. The ratio of the emulsifier solution to tall oil or asphalt preferably is such that the emulsion is about 50% tall oil and 50% emulsifier solution; however, acceptable ranges are from about 40% to 60% tall oil or asphalt, with the balance emulsifier solution. The finished emulsion preferably has a pH of from about 2.0 to about 5.0. Ideally, it is contemplated that the present invention be composed of approximately 40–50% (wt.) base material (TOP or asphalt), 6–12% organic acid, 40–50% water and approximately 2% emulsifier. The pH of such an emulsion is generally measured to be approximately 2–5 before being mixed with the soil and approximately 3–12 after the emulsion has been added to the soil. The pH will generally rise if a pozzalonic such as lime is also optionally added to the soil.

The prior art has taught the use of a pozzalonic, such as lime, in a system for fixation of lead and/or other metals in soil. However, the same prior art teaches the use of large quantities of lime for fixation which, among other things, dramatically increases the volume of the stabilized soil. By contrast, in using the emulsion-based organic acid containing system of the present invention, the benefits of a pozzalonic can be achieved with only, for example, 2–4% lime by weight. Pozzalonics, such as lime, can optionally be used for a variety of reasons. Specifically, lime improves curing times, enhances the workability of the soil and strengthens the soil for encouraging use of the stabilized soil as engineered fill and for construction purposes.

The finished emulsion typically has a composition substantially as follows:

| COMPONENTS | PERCENTAGE BY WEIGHT |
|---|---|
| water | 35.7–47.7 |
| agent | 0.3–12.0 |
| emulsifier | 02.00 |
| tall oil or asphalt | 50.00 |
| TOTAL | 100.00 |

Although the tall oil or asphalt component in the emulsion preferably is no more than about 50 to 55 weight percent, so as to prevent phase inversion and extend the shelf life of the emulsion, when used, the emulsion may be further diluted with water to a desired application strength, since the more dilute emulsion resulting will be used promptly.

Certain tests were conducted to determine the efficacy of the present invention. The results of those tests are shown in tabular form as follows:

TABLE

| SOIL | SAMPLED | BASE STOCK | ACID | LIME | SOAP | BASELINE | 0% | 2% | 4% | 6% | 8% | 10% | 12% | 16% | 20% | pH |
|---|---|---|---|---|---|---|---|---|---|---|---|---|---|---|---|---|
| 1/27/97 | 2/3/97 | 50% TOP | 2% OXALIC | | NP 2% | 75 | | | | | 21 | | 10 | 7.7 | | |
| 1/27/97 | 2/13/97 | 50% TOP | 2% OXALIC | | NP 2% | 73 | | | | | 20 | | 9.1 | 8.2 | | |
| 1/27/97 | 2/21/97 | 50% TOP | 2% OXALIC | | NP 2% | 64 | | | | | 15 | | 9.5 | 7.4 | | |

TABLE-continued

| SOIL | SAMPLED | BASE STOCK | ACID | LIME | SOAP | BASELINE | 0% | 2% | 4% | 6% | 8% | 10% | 12% | 16% | 20% | pH |
|---|---|---|---|---|---|---|---|---|---|---|---|---|---|---|---|---|
| 1/27/97 | 2/3/97 | 50% TOP | 3% OXALIC | | NP 2% | 75 | | | | | 10 | | 5.8 | 4.5 | | 5.5 |
| 1/27/97 | 2/13/97 | 50% TOP | 3% OXALIC | | NP 2% | 73 | | | | | 8.1 | | 7 | 5.2 | | |
| 1/27/97 | 2/21/97 | 50% TOP | 3% OXALIC | | NP 2% | 64 | | | | | 10 | | 5.5 | 3.8 | | |
| 2/24/97 | 3/3/97 | 50% TOP | 6% OXALIC | | NP 2% | 43 | | | | | 6.4 | | 3 | 3.2 | | |
| 2/24/97 | 3/13/97 | 50% TOP | 6% OXALIC | | NP 2% | 40 | | | | | 3.1 | | 2.1 | 2.5 | | |
| 4/21/97 | 4/24/97 | 50% TOP | 6% OXALIC | | NP 2% | 60 | | | | | 32 | | 1.7 | 3.7 | | |
| 4/21/97 | 5/5/97 | 50% TOP | 6% OXALIC | | NP 2% | | | | | | 3 | | 2.2 | 4.4 | | |
| 4/21/97 | 5/13/97 | 50% TOP | 6% OXALIC | | NP 2% | | | | | | 4.6 | | 3 | N.D. | | |
| 4/21/97 | 4/24/97 | 50% TOP | 6% OXALIC | 4% | NP 2% | 63 | | | | | | | N.D. | | | |
| 4/21/97 | 5/5/97 | 50% TOP | 6% OXALIC | | NP 2% | | | | | | | | N.D | | | |
| 4/21/97 | 5/13/97 | 50% TOP | 5% OXALIC | | NP 2% | | | | | | | | N.D. | | | |
| 4/24/97 | 4/29/97 | 50% ASPHALT | 6% OXALIC | | NP 2% | 43 | | | | | 13 | | 6.6 | 6.4 | | |
| 4/24/97 | 5/27/97 | 50% ASPHALT | 6% OXALIC | | NP 2% | 52 | | | | | 16 | | 8.5 | 6.6 | | |
| 5/21/97 | 5/28/97 | 50% ASPHALT | 2% HCL | | NP 2% | 47 | | | | | 53 | | 38 | 26 | | |
| 5/21/97 | 6/3/97 | 50% ASPHALT | 2% HCL | | NP 2% | 89 | | | | | 54 | | 40 | 39 | | |
| 4/24/97 | 4/29/97 | 50% ASPHALT | 6% OXALIC | 4% | NP 2% | 43 | | | | | | | N.D. | | | |
| 4/24/97 | 5/27/97 | 50% ASPHALT | 6% OXALIC | | NP 2% | 52 | | | | | | | N.D. | | | |
| 4/27/97 | 5/2/97 | 50% TOP | 2% HCL | | NP 2% | 43 | | | | | 18 | | 23 | 36 | | |
| 10/6/97 | 10/9/97 | 0 | 0 | 4% | NP 2% | 1200 | | | | | | | 350 | | | 12.4 |
| 10/6/97 | 10/9/97 | 50% TOP | 6% OXALIC | 0% | NP 2% | 1200 | | | | | | | 60 | | | 641 |
| 10/6/97 | 10/9/97 | 50% TOP | 6% OXALIC | 4% | NP 2% | 1200 | | | | | | | 44 | | | 11.8 |
| 10/6/97 | 10/9197 | 50% TOP | 12% PHOSPHATE | 0% | NP 2% | 1200 | | | | | | | 23 | | | 4.92 |
| 10/6/97 | 10/9/97 | 50% TOP | 12% PHOSPHATE | 4% | NP 2% | 1200 | | | | | | | ND | | | 12.2 |

Specifically, soil samples were spiked with laboratory-grade lead sulfate. Tests were done with emulsions based on asphalt, tall oil pitch and mixtures of the two base stocks. The "Baseline" in the table appearing above represents TCLP test results measured in mg/l for lead using untreated spiked soil. In the categories captioned "0%" to "20%" the dosage of emulsion added to and mixed with the spiked soil sample is recited. The numbers listed under these headings are the TCLP results for the treated samples. The above noted data also recites the difference between the date when the emulsion and soil were mixed and when the soil was measured to determine remediation. It is also noted that, in certain instances, lime was included as an optional expedient.

As the testing program proceeded, the addition of an organic acid, in this case oxalic, to the emulsion formulas was included. This was done partly to test the theory that chelation of the lead could be accomplished with these emulsions if an organic acid with a high stability constant for lead was added. Oxalic acid was chosen for testing because it was known that this acid is highly compatible with the TOP base stock. The test results with this organic acid showed improved immobilization of lead as compared to the use of the inorganic acid, HCl. Further testing of the conceptual model demonstrated that increasing the amount of organic acid in the final mixture resulted in improved treatment performance. Again, small amounts of lime were incorporated to demonstrate compatibility. It was also observed that results generally improved when the emulsion had an opportunity to "cure," that is, when the delay between mixing the emulsion in the soil and sampling the soil increased.

Since all of the results with organic acids had been obtained with TOP emulsions, the new phase of testing was done with asphalt emulsions to confirm that the conceptual model also applied to that base stock. A few tests were added to the study which included high concentrations of water. This was done because the present model was derived from the water chemistry of cationic metals chelating with fully ionized organic acids. These test results did show enhanced immobilization of lead with and without the addition of lime.

We claim:

1. A method of treating solid waste contaminated with a leachable cationic metal for clinically fixating said cationic metal without said solid waste, said method comprising mixing the solid waste with an oil in water cationic emulsion system that coats and applies a thin film of residue of said emulsion to immobilize by chemical fixation the cationic metal to reduce amounts of cationic metal leachable from said solid waste, said emulsion comprising an organic component comprising a member selected from the group consisting of asphalt and tall oil pitch and mixtures thereof, an aqueous phase including an emulsifying agent for said organic component and an agent comprising a member selected from the group consisting of carboxylic acid and precipitating agents for said cationic metal.

2. The method of claim 1 wherein said cationic metal is selected from the group consisting of lead, barium, beryllium, chrome III, cobalt, copper, nickel, silver and zinc.

3. The method of claim 1 wherein said solid waste comprises a member selected from the group consisting of soil, dredge spoils, ash, slag, concrete, brick, sludge, drilling mud, grit and mixtures thereof.

4. The method of claim 1 wherein lime is further added to said solid waste.

5. The method of claim 1 wherein said agent is an organic acid which forms a chelate with said leachable cationic metal.

6. The method of claim 5 wherein said organic acid comprises a member selected from the group consisting of oxalic acid, stearic acid and humic acid.

7. The method of claim 1 wherein said precipitating agent comprises phosphoric acid.

8. The method of claim 1 wherein said carboxylic acid is characterized as having a stability constant higher than acetic acid.

9. The method of claim 1 wherein said solid waste, after being combined with said emulsion is characterized as having a pH greater than the pK of said agent.

10. The method of claim 1 wherein said aqueous phase is characterized as having a pH which is adjusted through the addition of a member selected from the group consisting of HCl and NaOH.

11. The method of claim 1 wherein said aqueous phase comprises at least 30% by weight of said emulsion.

12. The method of claim 1 wherein said cationic metal is lead.

13. The method of claim 1 wherein said precipitating agent is phosphoric acid and said cationic meal is lead wherein they react with each other to form lead phosphate.

14. The method of claim 1 wherein said emulsion comprises tall oil having a pH below 7.0.

15. The method of claim 14 wherein said emulsion comprises tall oil having a pH between approximately 3.0 to 5.0.

16. The method of claim 1 wherein said aqueous phase comprises approximately 4% emulsifier, 84% water and 12% oxalic acid.

17. The method of claim 1 wherein said aqueous phase comprises approximately 4% emulsifier, 72% water and 24% phosphoric acid.

18. The method of claim 1 wherein said emulsion comprises 40–50% of said organic component, 6–12% organic acid, 40–50% water and 2% emulsifier.

19. The method of claim 1 wherein said emulsion includes an emulsifier that forms an amine salt in the presence of calcium hydroxide.

20. The method of claim 19 wherein said emulsion includes an emulsifier comprising a member selected from the group consisting of tallow diamine, tallow tetra amine, triamido amine, imodazaline and mixtures thereof.

21. A method of producing a construction material from solid waste contaminated with a leachable cationic metal, said method comprising mixing the solid waste with an oil in water cationic emulsion system that coats and applies a thin film of residue of said emulsion to immobilize by chemical fixation the cationic metal to reduce amounts of cationic metal leachable from said solid waste, said emulsion comprising an organic component comprising a member selected from the group consisting of asphalt and tall oil pitch and mixtures thereof, an aqueous phase including an emulsifying agent for said organic component and an agent comprising a member selected from the group consisting of carboxylic acid and precipitating agents for said cationic metal.

22. The method of claim 21 wherein said construction material is a member selected from the group consisting of general fill, trench backfill, non-expansive fill under concrete slab-on-grade, rammed soil, structural backfill, granular subbase, base for roadway construction, landfill capping material and roadway embankment erosion control capping.

* * * * *